Sept. 9, 1969 P. G. BARTLETT ET AL 3,466,618

MEMORY RESTORE CIRCUITS FOR BISTABLE MULTIVIBRATORS

Filed May 23, 1967 3 Sheets-Sheet 1

INVENTORS.
PETER G. BARTLETT &
JOSEPH E. MESCHI
BY
*Meyer, Tilberry & Body*
ATTORNEYS

MEMORY RESTORE CIRCUITS FOR BISTABLE MULTIVIBRATORS

Filed May 23, 1967 3 Sheets-Sheet 2

INVENTORS.
PETER G. BARTLETT &
JOSEPH E. MESCHI
BY
*Meyer, Tilberry & Body*
ATTORNEYS

MEMORY RESTORE CIRCUITS FOR BISTABLE MULTIVIBRATORS

Filed May 23, 1967 3 Sheets-Sheet 3

INVENTORS.
PETER G. BARTLETT &
JOSEPH E. MESCHI
BY
Meyer, Tilberry & Body
ATTORNEYS United States Patent Office 3,466,618
Patented Sept. 9, 1969

3,466,618
MEMORY RESTORE CIRCUITS FOR BISTABLE MULTIVIBRATORS

Peter G. Bartlett, Bettendorf, Iowa, and Joseph E. Meschi, Moline, Ill., assignors to E. W. Bliss Company, Canton, Ohio, a corporation of Delaware Filed May 23, 1967, Ser. No. 640,654
Int. Cl. G11b 9/02
U.S. Cl. 340—173.2 14 Claims

ABSTRACT OF THE DISCLOSURE

A memory restore circuit for actuating a bistable multivibrator to its last stable state upon removal and then return of power supplying bias potentials to the multivibrator. The memory restore circuit includes a ferroelectric capacitor which monitors the operation of the bistable multivibrator, and is polarized in one of two polarities in accordance with the last stable state of the multivibrator. A driver serves, upon receipt of a signal, to apply mechanical forces to the ferroelectric capacitor which serves to develop an output signal of a polarity in accordance with the last stable state of the multivibrator. This output signal is then applied to the multivibrator in such a manner to restore the multivibrator to its last stable state.

This invention is directed toward the art of bistable multivibrators in singular or in plural to define binary counter circuits and, more particularly, to memory restore circuits incorpoarting one or more ferroelectric capacitors for restoring a multivibrator to its last stable state when electical power for providing bias potentials for the multivibrator has been removed and then replaced.

The invention is particularly applicable in conjunction with restoring a multivibrator to its last stable state and will be particularly described in conjunction therewith; although, it is to be appreciated that the invention has broader applications and may, for example, be used in conjunction with various types of bistable circuits used in such circuits as binary counters, shift registers, input-output registers, accumulator registers, etc.

Bistable multivibrator circuits, sometimes known as flip-flop circuits, are well known in the art of electronics. Such circuits, for example, include two electronic control devices, such as transistors, of which one is conductive and the other is nonconductive during each stable state of the multivibrator circuit. So long as power to supply bias potentials is applied to the multivibrator circuit, the conductivity of the two transistors alternates from one to the other in response to successive trigger pulses applied to the circuit. Usually, the output is taken from the last transistor as either a binary "1" or a binary "0" signal, depending on the type of transistor employed and whether it is conductive or nonconductive. So long as the bias potentials are applied, the circuit remains in its last stable state awaiting another trigger pulse. But, when power supplying the bias potentials is removed, both transistors revert to their nonconducting conditions. Thereafter, when power is reapplied, one or the other of the two transistors will commence to conduct, forcing the other transistor to be nonconductive. Which transistor conducts first is usually an unstable and unpredictable parameter as it depends upon such factors as the construction and electrical tolerances of the various transistors. Accordingly, once power is reapplied, the circuit will not necessarily return to its last stable state. The United States patent to P. J. De Fries 3,155,833 proposes a permanent memory for a bistable multivibrator circuit wherein the permanent memory includes a saturated ferroelectric capacitor connected between the collectors of the two transistors constituting the multivibrator circuit. In this manner, the polarity of the charge on the ferroelectric capacitor depends upon which transistor is conducting. In the event of power failure, or interruption, the ferroelectric capacitor retains a permanent polarization so that when power is restored, the capacitor serves to bias into conduction the transistor which was last conducting. One problem with such a circuit is that reliance is placed on the ability of the capacitor to bias the multivibrator circuit into its last stable state, as opposed to positively pulsing the circuit back to its last stable state. Another problem with such a circuit is that there is no choice as to when the multivibrator circuit is returned to its last stable state, since there is no control over the ferroelectric capacitor to determine when it will bias the multivibrator circuit to its last stable state.

The present invention is directed toward an improved memory restore circuit for bistable multivibrator circuits utilizing ferroelectric capacitors, wherein a control signal is required o cause the ferroelectric capacitor to pulse the multivibrator circuit to its last stable state, thereby facilitating the use of the improved circuit in conjunction with the multistage binary counters, etc.

The present invention contemplates a multivibrator circuit having a pair of electronic control devices, such as triodes or transistors, each including first, second and control electrodes, with the first electrodes being coupled to a first bias potential and the second electrodes being connected to a second bias potential or to a reference potential. Also, each first electrode is coupled to the control electrode of the other control device to define a bistable multivibrator. Trigger pulses are applied to the control electrodes so that the two transistors alternate between conductive and nonconductive stable states in response to successive trigger pulses.

In accordance with the present invention, the memory restore circuit for restoring such a multivibrator circuit to its last stable state after power for the bias potentials has been removed and then replaced includes: a ferroelectric capacitor memory plate having first and second oppositely facing surfaces, and adapted to be polarized in one of two stable states by application of an electric field between the surfaces; actuatable driving means for transmitting mechanical forces to the memory plate which develops a direct current voltage output signal of a polarity in accordance with its state of polarization; circuit means for electrically connecting the multivibrator circuit with the memory plate for polarizing the memory plate by the bias potential or potentials in one of two stable states in accordance with the last stable state of the multivibrator circuit prior to loss of power and for applying the output signal to the multivibrator circuit so that upon return of the bias potential, the multivibrator circuit is actuated to its last stable state.

In accordance with a more limited aspect of the present invention, the driving means takes the form of a driver plate of piezoelectric material mechanically coupled to the memory plate, and the means for actuating the driver plate serves to apply a voltage thereto.

Still further in accordance with the invention, the memory plate and driver plate are secured together in substantial superimposed, parallel relationship in such a manner that the driver plate, when actuated, transmits mechanical forces to the memory plate in directions acting both laterally and perpendicularly of the memory plate.

The primary object of the present invention is to provide an improved memory restore circuit for returning a bistable multivibrator circuit to its last stable state upon removal and subsequent return of power.

Another object of the present invention, is to provide a memory restore circuit which returns a bistable multivibrator circuit to its last stable state only when a control signal is applied to the restore circuit.

A still further object of the present invention is to provide a memory restore circuit utilizing a ferroelectric capacitor having low current drain during the memory write function.

A still further object of the present invention is to provide a memory restore circuit incorporating a ferroelectric capacitor having a voltage controlled writing feature.

A still further object of the present invention is to provide a memory restore circuit incorporating nondestructive readout features offering greater reliability during memory interrogation.

A still further object of the present invention is to provide a memory restore circuit incorporating ferroelectric capacitors to obtain greater stability with variations in temperature.

The foregoing objects and other advantages of the invention will become more readily apparent from the following description of the preferred embodiments as illustrated in the accompanying drawings wherein.

Figure 1:
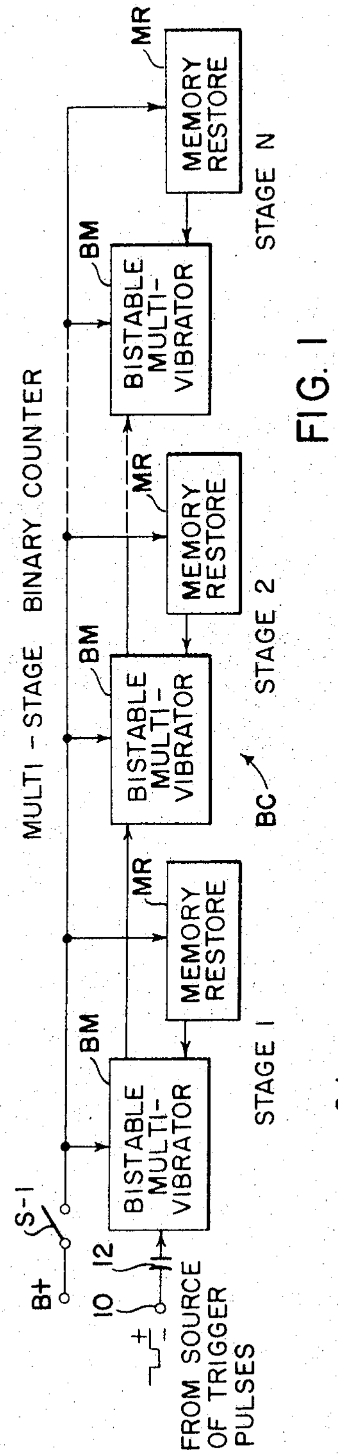
FIGURE 1 is a block diagram illustrating a multistage binary counter incorporating a memory restore circuit for each bistable multivibrator stage.

Refernce is now made to FIGURE 1 which illustrates a multistage binary counter BC. The binary counter includes plural stages, as desired, including stage 1, step 2, to stage N. Each stage of counter BC includes a bistable multivibrator circuit BM and a memory restore circuit MR. The output of each bistable multivibrator circuit BM is coupled to the input of the next succeeding bistable multivibrator circuit. Preferably, a source of trigger pulses, such as negative pulses, is connected to an input terminal 10 coupled through a capacitor 12 to the bistable multivibrator circuit of stage 1. A switch S1 connects all of the bistable multivibrator circuits with a source of B+ potential. Each memory restore circuit MR serves, after power has been removed and then replaced as by manipulating switch S1, to restore its associated bistable multivibrator circuit to its last stable state prior to the removal of power.

Dual supply bistable multivibrator

Figure 2:
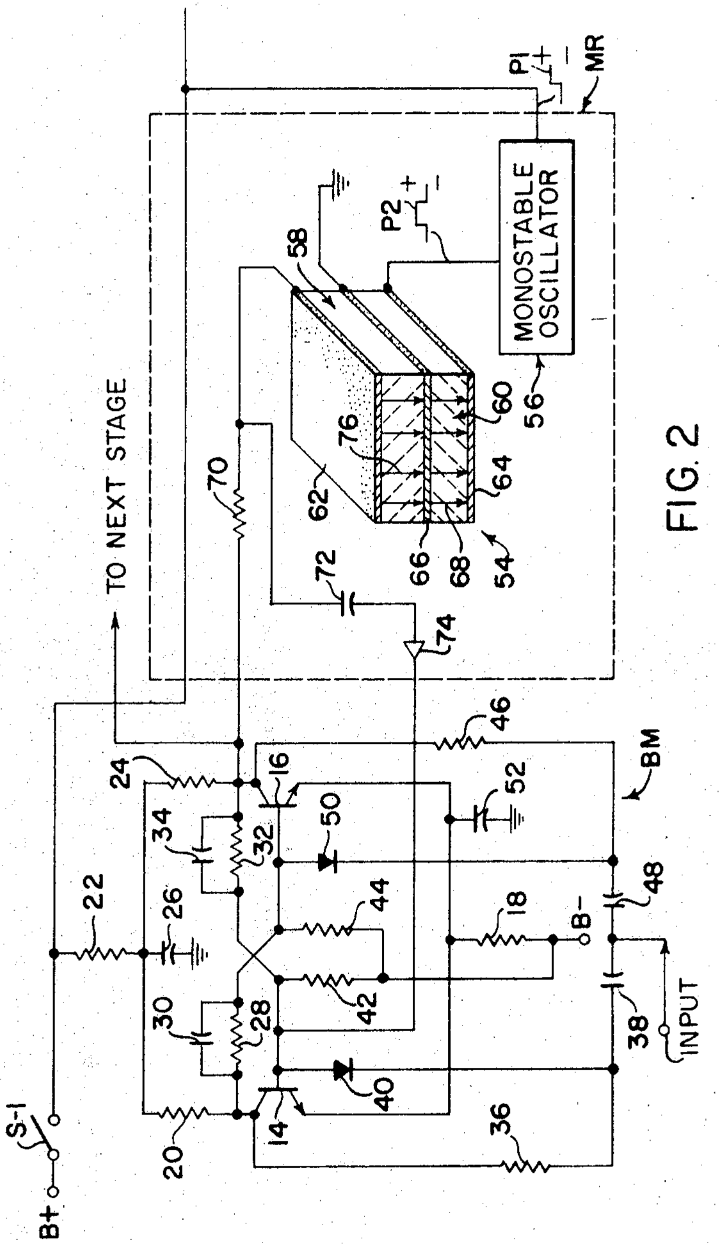
FIGURE 2 is a schematic illustration of one stage of the binary counter illustrated in FIGURE 1 and illustrating a bistable multivibrator circuit, together with a memory restore circuit constructed in accordance with the present invention.

Reference is now made to FIGURE 2 which schematically illustrates one stage of the binary counter BC. As illustrated, this stage of the binary counter includes a bistable multivibrator circuit BM and a memory restore circuit MR. The bistable multivibrator circuit BM includes a pair of NPN transistors 14 and 16, having their emitters connected in common and thence through a resistor 18 to a B− voltage supply source. The collector of transistor 14 is connected through a resistor 20, a resistor 22 and thence through switch S1 to the B+ voltage supply source. Similarly, the collector of transistor 16 is connected through a resistor 24 and thence through resistor 22 and switch S1 to the B+ voltage supply source. The junction of resistors 20 and 24 is connected through a capacitor 26 to ground. Also, the collector of transistor 14 is connected to the base of transistor 16 through a resistor 28 connected in parallel with a capacitor 30. Similarly, the collector of transistor 16 is connected with the base of transistor 14 through a resistor 32 connected in parallel with a capacitor 34. The collector of transistor 14 is also connected through a resistor 36 and a capacitor 38 to the input of the multivibrator circuit. A diode 40, poled as shown in FIGURE 2, is connected between the base of transistor 14 and the junction of resistor 36 and capacitor 38. Also, the base of transistor 14 is connected to the B− voltage supply source through a resistor 42. Similarly, the base of transistor 16 is connected through a resistor 44 to the B− voltage supply source. The collector of transistor 16 is connected through a resistor 46 and a capacitor 48 to the input of the multivibrator circuit A diode 50, poled as shown in FIGURE 2, is connected between the base of transistor 16 and the junction of resistor 46 and capacitor 48. The commonly connected emitters of transistors 14 and 16 are connected through a capacitor 52 to ground. The output connection to the next stage of the binary counter is taken at the collector of transistor 16.

Memory restore circuit

The memory restore circuit MR, as shown in FIGURE 2, includes a ceramic memory device 54 and a monostable oscillator 56. The memory device 54 may take other forms, but is preferably contructed in accordance with the teachings of United States patent application, Ser. No. 523,223, filed Feb. 14, 1966, now Patent No. 3,385,181, and assigned to the same assignee as the present invention. Briefly, ceramic memory device 54 generally comprises a memory plate 58 constructed of ferroelectric material, such as barium titanate, Rochelle salt, lead metaniobate or lead titanate zirconate composition, for example. In its preferred form, however, memory plate 58 is constructed of lead titanate zirconate composition since it is easy to polarize. Drive plate 60 is preferably constructed of ferroelectric material having piezoelectric characteristics, such as lead titanate zirconate composition. However, the drive plate may be constructed of any material that will change its dimensions upon application of an electrical signal, such as, for example, magnetostrictive material, which upon application of current thereto will undergo physical dimension changes. Drive plate 60 is permanently polarized and need not be constructed of easily polarizable material, such as lead titanate zirconate composition.

Plates 58 and 60 are, in their unstressed condition, approximately flat, and are oriented so as to be in substantial superimposed, parallel relationship. The upper surface of plate 58 is coated with an electrically conductive layer 62, and the lower surface of plate 60 is coated with an electrically conductive layer 64. Layers 62 and 64 may be of any suitable electrically conductive material, such as silver. Interposed between facing surfaces of plates 58 and 60 there is provided a third layer of electrically conductive material. Layer 66 may be constructed of conductive epoxy, such as epoxy silver solder, so that facing surfaces of plates 58 and 60 are electrically connected together as well as mechanically secured together. In this manner, as will be described below, when drive plate 60 is stressed it, in turn, transmits mechanical forces to plate 58 so as to mechanically stress plate 58 in directions acting both laterally and perpendicularly of its plane.

Drive plate 60 is preferably permanently prepolarized by applying an electrical field across its opposing flat surfaces. Thus, a direct current voltage is applied with the positive side connected to layer 66 and the negative side connected to layer 64 to polarize the drive plate. The applied electric field is sufficient to permanently polarize the plate and the direction of the applied field is indicated by arrows 68, as shown in FIGURE 2. Conductive layer 66 is electrically connected to ground and conductive layer 62 is connected through a resistor 70 to the collector of transistor 16. Also, conductive layer 62 is connected through a capacitor 72 and an amplifier 74 to the base of transistor 14. Conductive layer 64 is connected to the output of monostable oscillator 56, which has its input connected to switch S1.

Operation

The operation of the bistable multivibrator circuit BM is well known to those skilled in the art. Briefly, either transistor 14 or 16, but not both, is conductive during a stable state of the multivibrator circuit. This condition alternates between the two transistors upon receipt of successive trigger pulses at the input circuit. Thus, for example, with switch S1 closed so that both B+ potential and B− potential are applied, it may be assumed that transistor 14 is conductive and transistor 16 is nonconductive. During such a stable state the potential at the collector of transistor 14 is substantially that of the B− voltage supply source, and the potential at the collector of transistor 16 is substantially that of the B+ voltage supply source. Thereafter, upon receipt of the next trigger pulse, transistor 14 becomes nonconductive and transistor 16 becomes conductive. Therefore, the potential on the collector of transistor 14 will approach that of the B+ voltage supply source, and the potential on the collector of transistor 16 will approach that of the B− voltage supply source. The last stable state of the multivibrator circuit will remain so long as B+ and B− bias potentials are applied. However, if for some reason there is a loss of power, all transistors revert to their nonconductive condition. When power is reapplied, one or the other of the two transistors will become conductive, forcing the other to be nonconductive. Which transistor becomes conductive first is an unstable and usually unpredictable parameter and, hence, the circuit will not necessarily return to its last stable state.

In accordance with the present invention, memory plate 58 is polarized positively or negatively in accordance with the last stable state of the multivibrator circuit. Thus, for example, if the last stable state is the condition in which transistor 14 is nonconductive and transistor 16 is conductive, then the potential on the collector of transistor 16 approaches the B− voltage supply source. Accordingly, a negative potential is applied to layer 62 of memory plate 58. The potential, as taken between ground and the B− supply source or between ground and the B+ supply source, is of sufficient magnitude to polarize plate 58. Thus, with application of a B− voltage supply source to layer 62, plate 58 becomes polarized by an electric field having a direction extending from layer 66 to layer 62. In the other stable state condition, the collector of transistor 16 is substantially at the B+ potential and, accordingly, a positive potential is applied to layer 62. In such case, the electric field will be applied from layer 62 to layer 66 in accordance with the direction of the arrows 76 shown in FIGURE 2. This may be referred to as a binary "1" signal being stored by memory plate, with the opposite condition being referred to as a binary "0" signal.

If the last stable state of the bistable multivibrator circuit BM was that in which transistor 16 was nonconductive, then memory plate 58 stores a binary "1" signal, as indicated by the arrows 76 in FIGURE 2. If the power to supply the B− and B+ bias potentials is interrupted, transistors 14 and 16 will become nonconductive. Thereafter, when power is returned switch S1 may be closed at any desired point in time. This applies a pulse P1 to the input circuit of monostable oscillator 56. The monostable oscillator 56 responds to pulse P1 to apply an output pulse P2 of a constant wdith and magnitude to layer 64. Accordingly, an interrogation voltage has been applied between layer 64 and ground across opposing surfaces of drive plate 60. If the interrogation voltage is of a polarity opposite to the direction of polarization of drive plate 60, then the magnitude of this interrogation voltage is kept well below the polarization voltage threshold, i.e., the voltage required to permanently polarize drive plate 60 so that this readout process is nondestructive. Application of the readout voltage pulse P2 causes the drive plate to contract or expand, dependent upon its prepolarization as well as the polarity of the applied readout voltage pulse. The direction of contraction or expansion will be both laterally and perpendicularly of the plate defined by plate 60. Since plates 58 and 60 are bonded together, as by the layer 66 of conductive epoxy, any change in physical dimensions of plate 60 will cause corresponding changes in physical dimensions of plate 58. When the memory plate 58 is thus stressed, it develops a voltage which appears between layers 66 and 62 with the polarity at layer 62 being positive or negative, dependent on the state of prepolarization of the memory plate as well as the direction of mechanical stress. Thus, with reference to FIGURE 2, the output voltage as taken at the layer 62 with reference to ground will be a positive pulse representative that a binary "1" signal is stored by plate 58. This positive pulse has a duration dependent on the duration of pulse P2 and is applied through capacitor 72 and amplifier 74 to the base of transistor 14. This forward biases transistor 14 into conduction whereupon the potential at its collector approaches that of B− voltage supply source. Accordingly, this negative potential is applied from the collector of transistor 14 through resistor 28 to the base of transistor 16 to reverse bias this transistor. Accordingly, the output voltage on the collector of transistor 16 is at a positive potential approaching that of the B+ voltage supply source. Also, the positive output voltage of the memory plate 58 is applied through resistor 70 to the collector of transistor 16. If desired, the circuit connection including capacitor 72 and amplifier 74 may be eliminated together with resistor 70 so that the positive output voltage is applied only to the collector of transistor 16. In such case, this positive voltage would be applied through resistor 32 to the base of transistor 14 to bias it into conduction.

Multistage common memory restore circuit

Figure 3:
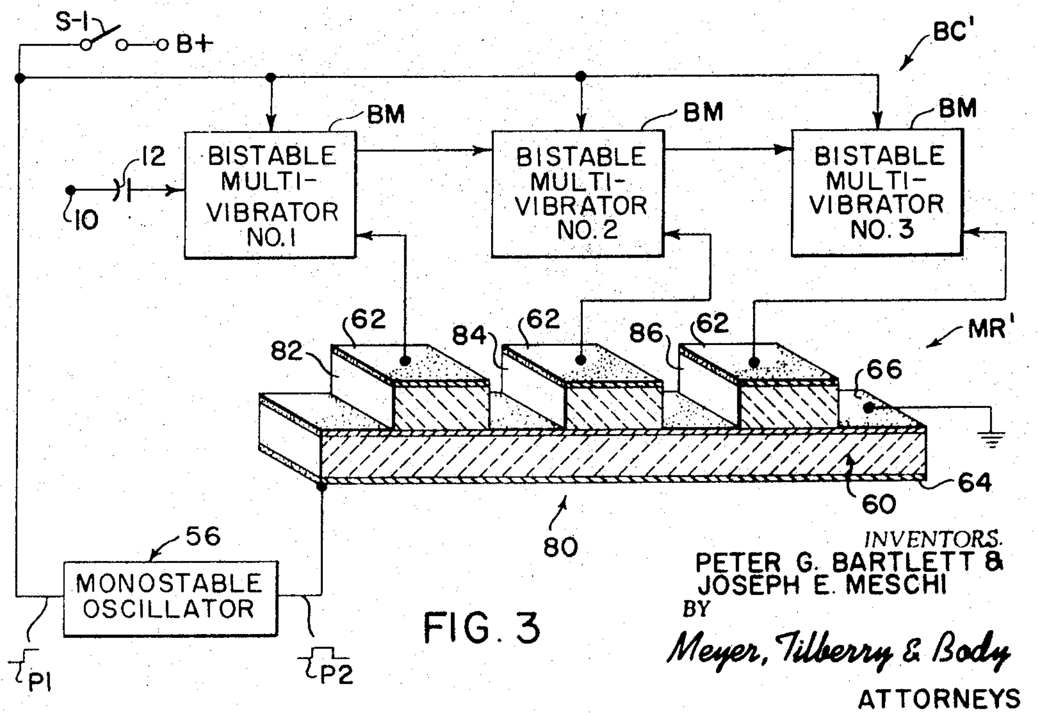
FIGURE 3 is a combined block diagram schematic illustration of a multistage binary counter incorporating a single memory restore circuit for all stages.

In the preceding discussion, each bistable multivibrator circuit BM of FIGURE 1 has associated therewith a memory restore circuit MR. In FIGURE 3 there is also illustrated a binary counter BC′ having three stages, each including a bistable multivibrator circuit BM. Each bistable multivibrator circuit is constructed as shown in FIGURE 2. However, instead of each stage having associated therewith a single memory restore circuit, the embodiment according to FIGURE 3 includes a single memory restore circuit MR′ for all three stages. Since this aspect of the invention is similar to that as illustrated in FIGURE 2, like components are illustrated and identified with like character references for purposes of simplifying the discussion of the invention.

Memory restore circuit MR′ is quite similar to memory restore circuit MR and includes a monostable oscillator 56 and a ceramic memory device 80. The ceramic memory device 80, like the ceramic memory device 54 illustrated in FIGURE 2, includes a driver plate 60 having a conductive layer 64 on its lower surface, and a conductive layer 66 on its upper surface. However, in accordance with this embodiment of the invention, three memory plates, one for each stage of the binary counter BC′, are provided. Each memory plate is similar to memory plate 58 illustrated in FIGURE 2. These memory plates are illustrated in FIGURE 3 as memory plates 82, 84 and 86, respectively associated with stages 1, 2 and 3 of binary counter BC′. The three memory plates are longitudinally spaced from each other and are secured at their lower surfaces to the drive plate 60, as by the epoxy conductive bond provided by layer 66. The upper surface of each memory plate is coated with a layer 62 of conductive material. The upper surface of each memory plate is electrically connected with its associated bistable multivibrator circuit in the same manner as the upper surface of plate 58 is connected with the bistable multivibrator circuit shown in FIGURE 2. The output circuit of monostable oscillator 56 is connected to the lower layer 64 on plate 60 and the upper layer 66 of plate 60 is connected to ground.

The operation of the embodiment as illustrated in FIGURE 3 is essentially the same as that discussed previously with respect to the embodiment shown in FIGURE 2. Thus, as each bistable multivibrator circuit is actuated from one stable state to the other, it serves to apply a polarizing potential in either one of two directions to its associated memory plate 82, 84 or 86. After the power for the bias potentials has been removed and then replaced, switch S1 is closed to apply a pulse P1 to the monostable oscillator 56. Oscillator 56, in turn, applies a pulse P2 which actuates drive plate 60. Drive plate 60, in a manner as described hereinbefore with reference to FIGURE 2, transmits mechanical forces to memory plates 82, 84 and 86. These memory plates then apply voltage pulses to the respective bistable multivibrator circuits in accordance with their last stable states, and thereby restore the binary counter BC′ to its last stable state.

Single supply bistable multivibrator

Figure 4:
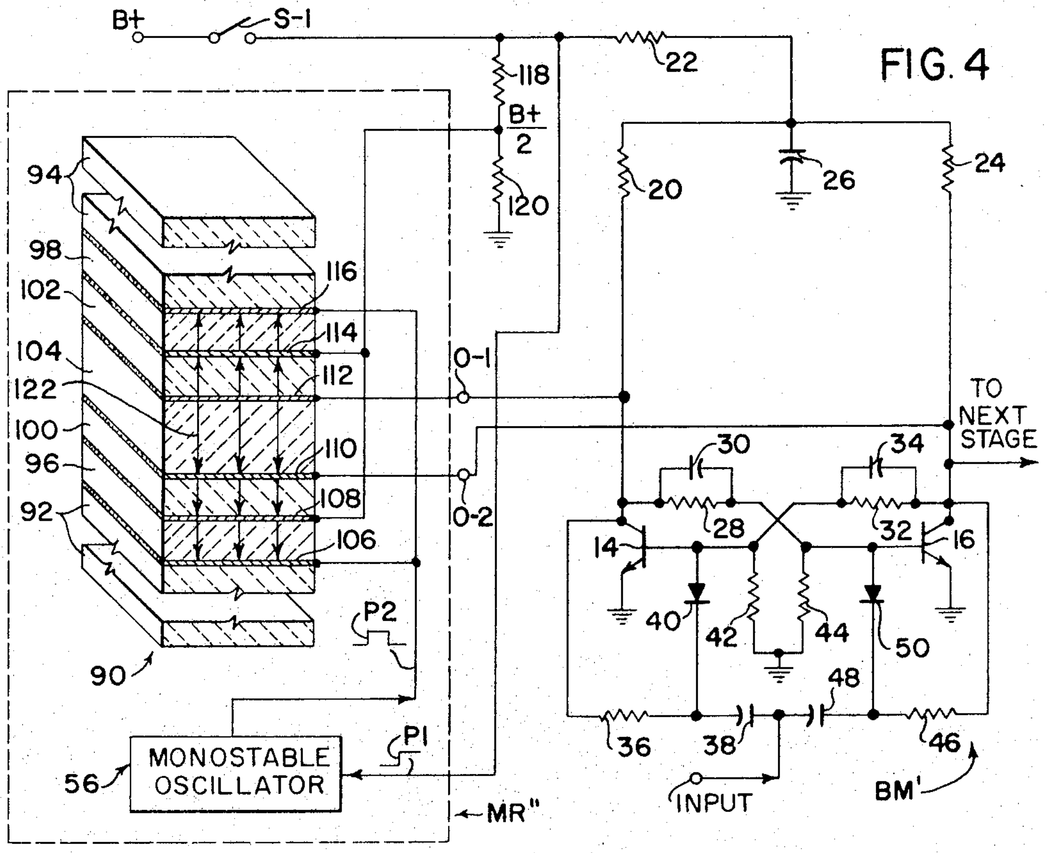
FIGURE 4 is a schematic illustration of a second bistable multivibrator circuit together with a memory restore circuit.

The bistable multivibrator circuit BM illustrated in FIGURE 2 includes both a B+ votage supply source as well as a B− voltage supply source. Frequently, however, bistable multivibrator circuits include only a B+ voltage supply source. Such a circuit is shown in FIGURE 4 together with another embodiment of the memory restore circuit. Accordingly, each stage of the binary counter of FIGURE 1 may take the form as illustrated in FIGURE 4.

The bistable multivibrator circuit BM′ of FIGURE 4 is quite similar to that of the circuit illustrated in FIGURE 2 and, accordingly, like components are identified with like character references for purposes of simplifying the discussion of the invention. It will be noted from FIGURE 4 that, in accordance with this embodiment, the emitters of transistors 14 and 16 are connected directly with ground, and resistors 42 and 44 are connected to ground. The operation of the circuit is substantially that of FIGURE 2, with the exception of that whenever one of the two transistors is conducting its collector potential approaches that of ground potential, as opposed to the B− potential of the circuit in FIGURE 2. The collector voltage of the nonconducting transistor approaches that of the B+ voltage source.

The memory restore circuit MR″ for the bistable multivibrator circuit of FIGURE 4 includes a ceramic memory device 90 and a monostable oscillator circuit 56. The ceramic memory device 90 takes the form of a double driven, double bit line, single bit ceramic memory which is preferably constructed in accordance with the teachings of our United States Patent No. 3,401,377, entitled "Ceramic Memory Having a Piezoelectric Drive Member," and assigned to the same assignee as the present invention.

Ceramic memory device 90 generally includes lower and upper damper plates 92 and 94, lower and upper isolation plates 100, 102, lower and upper drive plates 96, 98, and a memory plate 104. These plates are oriented in substantial superimposed, parallel relationship. A layer of conductive material is interposed between facing surfaces of adjacent plates. Thus, a layer 106 of conductive material is interposed between plates 92 and 96. A layer 110 of conductive material is interposed between plates 100 and 104. Similarly, conductive layers 112, 114 and 116 are respectively interposed between plates 104, 102 and 102, 98, and 98 and 94. All of the plates are preferably constructed of ferroelectric material, with plates 92 and 94 serving as damper plates for purposes of dampening acoustic vibrations. Plates 96 and 98 are drive plates and serve the same function as drive plates 60 of FIGURE 2. Plates 100 and 102 serve as isolation plates. These plates together with isolation layers 108 and 114 serve to minimize capacitor coupling. Plate 104 is a memory plate and serves the same function as memory plate 58 in FIGURE 2. Preferably, plates 96, 100, 102 and 98 are each of substantially the same thickness. Memory plate 104 is substantially on the order of twice the thickness of any one of plates 96, 98, 100 or 102. Conductive layers 110 and 112 are connected to output terminals 0–1 and 0–2, respectively, and thence to the collectors of transistors 14 and 16. Conductive layers 108 and 114 are electrically connected together and thence to a voltage divider including series connected resistors 118 and 120 which are connected between ground and the B+ voltage supply source, so that when switches S1 closes, a potential on the order of 0.5B+ is applied to layers 108 and 114. Similarly, layers 106 and 116 are electrically connected together and thence to the output circuit of the monostable oscillator 56. The input to the monostable oscillator is taken at the junction of resistor 22 and resistor 118.

In the operation of the circuitry shown in FIGURE 4, it may be assumed that the last stable state is that in which transistor 14 is nonconductive and transistor 16 is conducting. Accrodingly, the potential on the collector of transistor 14 approaches that of the B+ voltage supply source, and potential on collector of transistor 16 approaches that of ground potential. Thus, a positive potential is applied to layer 112 and a ground potential is applied to layer 110 in the ceramic memory device 90. The B+ potential is sufficient to polarize memory plate 104 and, accordingly, the applied electric field will be in the direction of the arrows as shown in FIGURE 4. Preferably, drive plates 96 and 98 are permanently prepolarized in accordance with the direction of the arrows shown on those plates in FIGURE 4. Since a positive potential is applied to layer 112 and a ground potential is applied to layer 110, the isolation plates 100 and 102 will be oppositely polarized in a manner as shown by the arrows on those plates in FIGURE 4.

After power is removed and then replaced, the bistable multivibrator circuit may be returned to its last stable state upon closure of switch S1. This applies a pulse P1 to the monostable oscillator circuit 56. Oscillator circuit 56, in turn, applies a positive interrogating pulse P2 to layers 106 and 116. The plates may be secured together as by epoxy bond interposed between adjacent plates. Preferably, however, all of the plates are secured together by heat fusing so that a monolithic ceramic array is obtained. Accordingly, when an interrogating pulse P2 is applied to driver plates 96 and 98, these plates undergo physical dimension changes which are transmitted through the isolation plates 100 and 102 to the memory plate 104 by inverse piezoelectric action. Accordingly, plate 104 is mechanically stressed by forces acting in directions both laterally and vertically of its plane so that a positive potential is obtained at output terminal 0–1 with respect to that at output terminal 0–2. The positive potential obtained at output terminal 0–1 is applied both to the collector of transistor 14 as well as through resistor 28 to the base of transistor 16. This forces transistor 16 into conduction and, in turn, transistor 14 is forced into its nonconductive state. In this manner, the bistable multivibrator circuit of FIGURE 4 is returned to its last stable state prior to power removal.

Multistage memory restore circuit

Figure 8:
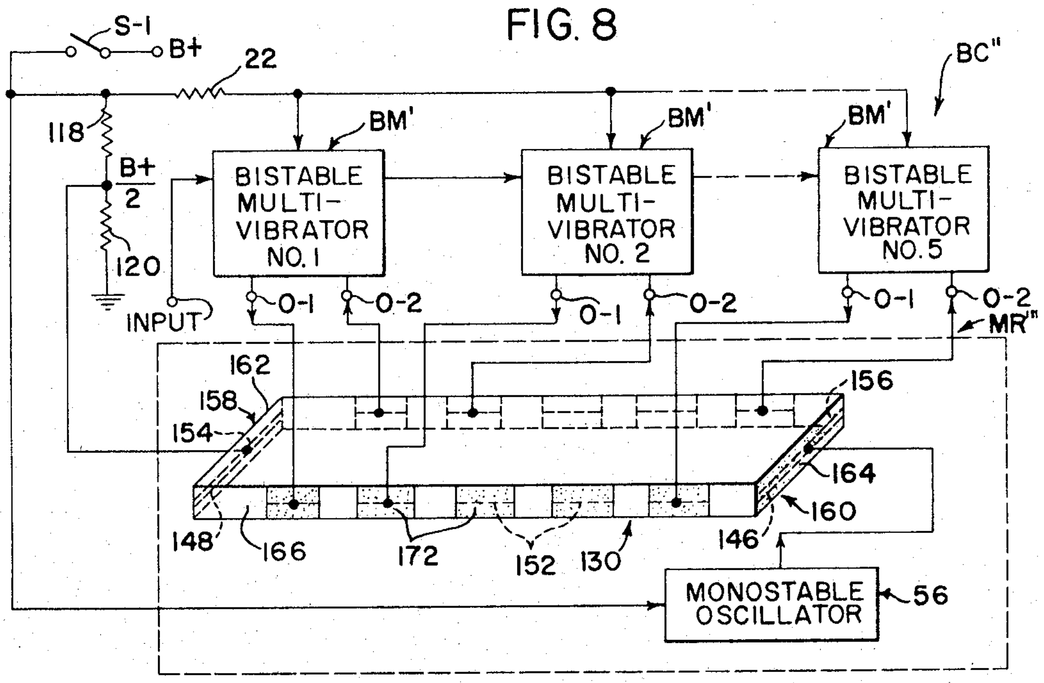
FIGURE 8 is a combined block diagram schematic illustration of a multistage binary counter incorporating a single memory restore circuit which includes a ceramic memory as illustrated in FIGURE 5.

In the embodiment of the invention as illustrated in FIGURE 4, it is contemplated that a memory restore circuit MR″ be used in conjunction with each single source multivibrator circuit. Reference is now made to FIGURE 8 which discloses a multistage binary counter BC''. Each bistable multivibrator circuit of this binary counter takes the form as illustrated in FIGURE 4, i.e., each stage includes only a single power supply to provide B+ potential as opposed to the circuitry of FIGURE 2 which includes both B+ and B− voltage sources. Since the embodiment illustrated in FIGURE 8 is quite similar to that as illustrated in FIGURE 4, like components are identified with like character references for purposes of simplifying the discussion of the invention. Of significance, however, is that a single memory restore circuit MR''' is used in conjunction with the multistage binary counter BC''. Memory restore circuit MR''' includes a ceramic memory device 130 and a monostable oscillator 56.

Figure 7:
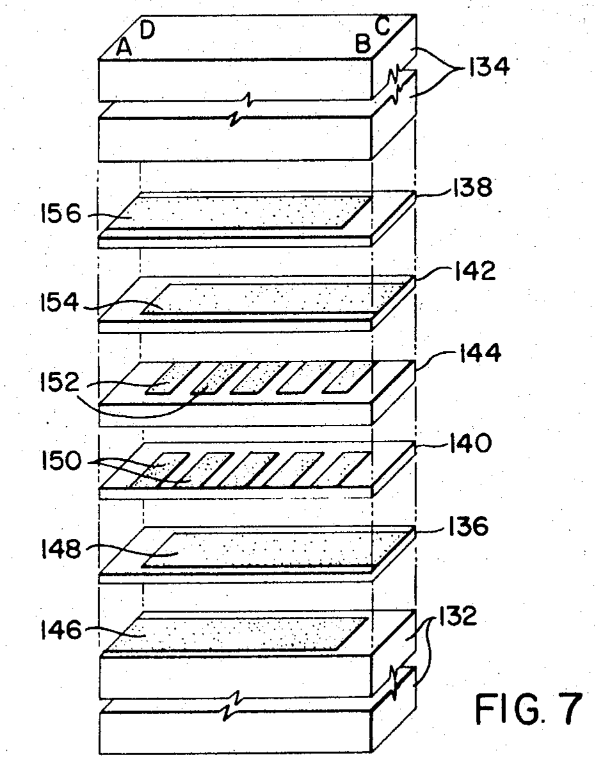
FIGURE 7 is a perspective exploded view of the memory illustrated in FIGURE 5.
Figure 5:
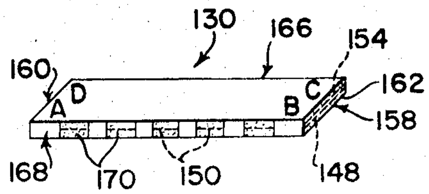
FIGURE 5 is a perspective view illustrating a ceramic memory.

The ceramic memory device 130, as shown in FIGURE 5, takes the form of a monolithic multibit, double bit line, common word driver ceramic memory array. Preferably, this array is constructed in accordance with the teachings of our aforementioned United States Patent No. 3,401,377. As shown in FIGURE 7, ceramic memory device 130, like ceramic memory device 90 of FIGURE 4, includes lower and upper damper plates 132 and 134, lower and upper drive plates 136 and 138, and lower and upper isolation plates 140 and 142. A single memory plate 144 is interposed between plates 140 and 142. Plates 136, 140, 142 and 138 are each of substantially the same thickness. Memory plate 144 is on the order of twice as thick as any one of plates 136, 138, 140 or 142. Damper plates 132 and 134 are relatively thick, such as on the order of fifteen times as thick as, for example, plate 136. A single electrically conductive drive line strip 146 is interposed between facing surfaces of plates 132 and 136. Also, a single electrically conductive isolation layer 148 is interposed between facing surfaces of plates 136 and 140. A first plurality of longitudinally spaced, electrically conductive, bit line strips 150 are interposed between plates 140 and 144 with the strips extending transversely of strips 146 and 148. A second plurality of bit line strips 152 is interposed between plates 142 and 144 with corresponding strips 150 and 152 being oriented in substantially superimposed, parallel relationship. Another single isolation layer 154 of electrically conductive material is interposed between plates 142 and 138 and arranged in substantial superimposed relationship with strip 148. Lastly, another drive line strip 156 of electrically conductive material is interposed between plates 138 and 134 and is arranged in generally superimposed parallel relationship with drive line strip 146.

Plates 132, 136, 140, 144, 142, 138 and 134 may be secured to each other by constructing the conductive strips and layers of electrically conductive epoxy, such as epoxy silver solder, so that the plates are restrained in both lateral and perpendicular directions of their respective planes. Preferably, however, the plates are bonded to each other by heat fusing. More particularly, the device may be constructed by first laying down a relatively thick layer of acoustic dispersive ceramic material in a semigreen state, i.e., not heat fused but ceramic powder mixed with a binder to define damper plate 132. Preferably, the semigreen ceramic takes the form of powdered lead titanate zirconate composition and any suitable binder that will oxidize and burn off when heated, such as paraffin. The electrically conductive drive line strip 146 is defined by applying a layer of powdered conductive material, such as powdered platinum oxide, as by silk screening, on the upper surface of plate 132. Another layer of semigreen ceramic material, preferably lead titanate zirconate composition, is then applied on top of strip 146 to define drive plate 136. Then another layer of powdered platinum oxide is applied to the upper surface of plate 136 to define isolation strip 148. On top of this latter layer of conductive strip, another layer of green ceramic material is applied to define isolation plate 140. On top of this plate a plurality of layers of powdered conductive material, such as powder platinum oxide, is applied to define strips 150. The remaining plates and conductive strips are applied in the same manner to obtain the structure as shown in FIGURE 7. The composite structure is then heated to a temperature approximately 2,400° F. to 2,500° F., sufficient that the material fuses, whereby each layer of material is securely bonded to its adjacent layer of material. The resultant structure is a monolithic ceramic memory array, having a bond sufficient that application of a voltage across opposite surfaces of the respective drive plates causes transmission of mechanical forces to the memory plate, which forces act both laterally and perpendicularly of the plane defined by the memory plate.

Figure 6:
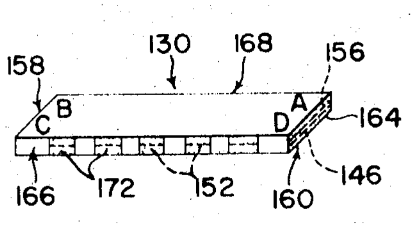
FIGURE 6 is a perspective view of the ceramic memory illustrated in FIGURE 5 but taken from a different direction.

After the structure has been heat fused, it has four flush edges as shown in FIGURES 5 and 6. These edges include an isolation face 158 and a drive face 160 on opposite ends of device 130. The isolation layers 154 and 148 extend to the isolation face where an electrically solderable contact pad 162 is secured to the isolation face so as to be in electrical contact with both isolation layers. Similarly, drive line strips 146 and 156 extend to drive face 160 where an electrically solderable contact pad 164 is secured to the drive face and is in electrical contact with both drive line strips. In addition to the drive face and isolation face, the ceramic memory device 130 also includes a bit face 166 and a second bit face 168. Bit line strips 150 extend to bit face 168. A plurality of contact pads 170 are secured to the bit face with each pad being in electrical contact with one bit line strip 150. Similarly, bit line strips 152 extend to bit face 166, where a plurality of electrically solderable contact pads 172 are secured to the bit face with each pad being secured to one bit line strip 152.

As shown in FIGURE 8, the ceramic memory device 130 is connected to the bistable multivibrator circuits 1 through 5. Each bistable multivibrator circuit takes the form as is shown in FIGURE 4. Thus, with respect to bistable multivibrator circuit No. 1, its output terminal 0–1 is connected to a contact pad 172 on bit face 166 and ouput terminal 0–2 is connected to a contact pad 170 on bit face 168 associated with the same bit. The output terminals 0–1 and 0–2 of multivibrator circuit No. 2 are connected in the same manner to the device 130, but to the second bit. Similar connections are made with bistable multivibrator circuits Nos. 3 and 4 (not shown) as well as with bistable multivibrator circuit No. 5. The output of the monostable oscillator circuit 56 is electrically connected with contact pad 164 on the drive face 160. Similarly, the junction of resistors 118 and 120 is electrically connected to contact pad 162 on isolation face 158. The operation of the circuit illustrated in FIGURE 8 is essentially the same as that illustrated in FIGURE 4, with the exception that upon closure of switch S1, the monostable oscillator 56 applies an interrogating voltage pulse to both drive plates 136 and 138 so that all bits are actauted at the same time. In this manner, each multivibrator circuit of binary counter BC'' is returned to the condition of its last stable state prior to loss of power.

Although the invention has been shown in connection with preferred embodiments, it will be readily apparent to those skilled in the art that various changes in form and arrangements of parts may be made to suit requirements without departing from the spirit and scope of the invenion as disclosed.

We claim:

1. A memory restore circuit for a bistable multivibrator having a pair of electronic control devices each including first, second and control electrodes; said first electrodes being coupled to a first electrical potential; said second electrodes being connected to a second electrical potential; each said first electrode being coupled to the control electrode of said other control device to define a bistable multivibrator; means for applying trigger pulses to said control electrodes so that said two control devices alternate between conductive and nonconductive stable states in response to successive trigger pulses; said memory restore circuit for restoring a said multivibrator to its last stable state after power for at least one of said potentials has been removed and replaced, including:

a ferroelectric storage capacitor memory plate having first and second oppositely facing surfaces, said memory plate adapted to be polarized in one of two stable states by application of an electric field between said surfaces;

actuatable driving means for transmitting mechanical forces to said memory plate which develops a direct current voltage output signal of a polarity in accordance with its state of polarization; and, circuit means for electrically connecting at least one of said control devices of said multivibrator circuit to said memory plate for polarizing said memory plate by said potentials in one of two stable states in accordance with the last stable state of said multivibrator circuit prior to removal of said power and for applying said output signal to said multivibrator circuit so that after said power is returned the said multivibrator circuit is actuated to its last stable state.

2. A memory restore circuit as set forth in claim 1, wherein said driving means is a driver plate of piezoelectric material and mechanically coupled to said memory plate, and said means for actuating same serves to apply a voltage to said driver plate.

3. A momery restore circuit as set forth in claim 2, wherein said memory plate and said driver plate are secured together in substantial superimposed parallel relationship in such a manner that said driver plate, when actuated, transmits mechanical forces to said memory plate in directions acting both laterally and perpendicularly of said memory plate.

4. A memory restore circuit for a bistable multivibrator circuit having a pair of electronic control devices each including first, second and control electrodes; said first electrodes being coupled to a first direct current bias potential of one polarity; said second electrodes being coupled to a second direct current bias potential of an opposite second polarity; each said first electrode being coupled to the control electrode of the other control device to define a bistable multivibrator circuit; means for applying trigger pulses to said control electrodes so that said two control devices alternate between conductive and nonconductive states in response to successive trigger pulses so long as power is applied to maintain said bias potentials; said memory restore circuit for restoring said multivibrator circuit to its last stable state after said power is removed and then replaced comprising:

a ferroelectric storage capacitor memory plate having first and second oppositely facing surfaces, said memory plate adapted to be polarized in one of two stable states by application of an electric field between said surfaces;

first and second circuit means electrically connecting the first and second surfaces of said memory plate with the first electrode of one of said control devices and with a reference potential, respectively, whereby said memory plate is polarized by said first bias potential and said reference potential in one stable state when said one control device is nonconducting and oppositely polarized by said second bias potential and said reference potential when said one control device is conducting;

actuatable driving means for transmitting mechanical forces to said memory plate which becomes stressed to develop a direct current voltage output signal of a polarity of accordance with its state of polarization; and, output circuit means for applying said output signal to the control electrode of one of said control devices in such a manner to actuate said multivibrator circuit to its last stable state.

5. A memory restore circuit as set forth in claim 4, including actuating means for actuating said actuatable driving means.

6. A memory restore circuit as set forth in claim 5, wherein said driving means is a driver plate of piezoelectric material mechanically secured to said memory plate, and said actuating means serves to apply an interrogating voltage to said driver plate which through piezoelectric action transmits mechanical forces to said memory plate.

7. A memory restore circuit as set forth in claim 6, wherein said driver plate has first and second oppositely facing surfaces, said memory and driver plates being secured together in such a manner that application of an interrogating voltage across said surfaces of said driver plate causes said driver plate to transmit mechanical forces to said memory plate acting in directions both laterally and perpendicularly of said memory plate.

8. A memory restore circuit as set forth in claim 7, wherein said driver plate has its first surface coupled to said reference potential and its second surface coupled to said driver plate actuating means.

9. A memory restore circuit as set forth in claim 8, wherein said driver plate actuating means includes circuit means for applying a said interrogating voltage to the second surface of said driver plate.

10. A plurality of memory restore circuits each as set forth in claim 9 in combination with a like plurality of said multivibrator circuits each having associated therewith a said memory restore circuit, and wherein the said trigger means for each multivibrator circuit includes a circuit connection between that multivibrator circuit and a succeeding said multivibrator circuit, said circuit connection being an electrical coupling from the first electrode of a said one control device in one multivibrator circuit to the said control electrodes of the said pair of electronic control devices in a second multivibrator circuit, whereby each multivibrator circuit is one stage of a multistage binary counter with each said stage having associated therewith a said memory restore circuit.

11. A memory restore circuit as set forth in claim 9, in combination with a plurality of said multivibrator circuits connected together to define a multistage binary counter, and wherein said memory restore circuit includes a like plurality of memory plates each associated with and connected to one of said multivibrator circuits, said memory plates being longitudinally spaced from each other and mechanically secured to said driver plate.

12. A memory restore circuit for a bistable multivibrator circuit having first and second electronic control devices each including first, second and control electrodes; said first electrodes being coupled to a first direct current bias potential of a first polarity; said second electrodes being coupled to a reference potential; each said first electrode being coupled to the control electrode of the other transistor to define a bistable multivibrator circuit; means for applying trigger pulses to said control electrodes so that said two control devices alternate between conductive and nonconductive states in response to successive trigger pulses so long as power is applied to maintain said first bias potential; said memory restore circuit for restoring said multivibrator circuit to its last stable state after said power is removed and then replaced and comprising:

a ferroelectric storage capacitor memory plate having first and second oppositely facing surfaces, said memory plate adapted to be polarized in one of two stable states by application of an electric field between said surfaces;

first and second circuit means electrically connecting the first electrode of said first control device with said first surface and the first electrode of said second transistor with second surface, respectively, whereby during each stable state of said multivibrator circuit said memory plate is polarized by said first bias potential and said reference potential in one of its two stable states depending upon which said electronic control device is conducting and which is non-conducting;

actuatable driving means for transmitting mechanical forces to said memory plate, whereby said plate is stressed to develop a direct current output voltage of a polarity on one surface relative to the other surface in accordance with its state of polarization, said output voltage being applied to said multivibrator circuit by said first and second circuit means to force said first and second electronic control devices into their last stable state conditions prior to loss of power.

13. A memory restore circuit as set forth in claim 12, wherein said driving means includes a driver plate of piezoelectric material mechanically secured to said memory plate in such a manner that application of an interrogation voltage between oppositely facing surfaces of said driver plate causes said driver plate to transmit mechanical forces to said memory plate acting in directions both laterally and perpendicularly of said memory plate.

14. A memory restore circuit as set forth in claim 13 in combination with a plurality of said multivibrator circuits to define a multistage binary counter, and wherein said memory restore circuit includes a like plurality of said first and second circuit means.

References Cited

UNITED STATES PATENTS

| | | | |
|---|---|---|---|
| 2,995,735 | 8/1961 | Frank | 340—174 |
| 3,155,833 | 11/1964 | De Fries | 340—173.2 |

BERNARD KONICK, Primary Examiner

J. F. BREIMAYER, Assistant Examiner

U.S. Cl. X.R.

307—278, 291; 340—173